(12) United States Patent
Alvarez Valenzuela et al.

(10) Patent No.: US 10,608,752 B2
(45) Date of Patent: Mar. 31, 2020

(54) MULTILEVEL CONVERTER

(71) Applicant: SIEMENS AKTIENGESELLSCHAFT, Munich (DE)

(72) Inventors: Rodrigo Alonso Alvarez Valenzuela, Nuremberg (DE); Joerg Dorn, Buttenheim (DE); Dominik Ergin, Baiersdorf (DE); Herbert Gambach, Uttenreuth (DE); Martin Pieschel, Nuremberg (DE); Frank Schremmer, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/070,063

(22) PCT Filed: Jan. 19, 2016

(86) PCT No.: PCT/EP2016/050956
§ 371 (c)(1),
(2) Date: Jul. 13, 2018

(87) PCT Pub. No.: WO2017/125132
PCT Pub. Date: Jul. 27, 2017

(65) Prior Publication Data
US 2019/0044620 A1   Feb. 7, 2019

(51) Int. Cl.
*H04B 10/00*   (2013.01)
*H04B 10/80*   (2013.01)
(Continued)

(52) U.S. Cl.
CPC .......... *H04B 10/807* (2013.01); *G08C 23/06* (2013.01); *H02M 1/0845* (2013.01);
(Continued)

(58) Field of Classification Search
CPC .... H04B 10/032; H04B 10/272; H04B 10/50; H04B 10/807; G02B 6/43; H04J 14/0291;
(Continued)

(56) References Cited

U.S. PATENT DOCUMENTS 7,577,008 B2   8/2009   Hiller
8,400,796 B2 *  3/2013   Dofnas ................. H02M 7/483
                                                      363/71
(Continued)

FOREIGN PATENT DOCUMENTS

DE   102005041087 A1   3/2007
EP       2549634 A1 *  1/2013   ............. H02M 7/49
(Continued)

*Primary Examiner* — Hibret A Woldekidan
(74) *Attorney, Agent, or Firm* — Laurence Greenberg; Werner Stemer; Ralph Locher (57) ABSTRACT

A modular multilevel converter has a plurality of sub-modules, each of which includes at least two electronic switching elements and an electrical energy storage device. The sub-modules are controlled by a control device. An optical output of the control device of the converter is connected to an input of an optical distributor by way of a first optical waveguide. A plurality of outputs of the optical distributor are individually connected to an optical input of one of the sub-modules, respectively, by way of a second optical waveguide.

14 Claims, 5 Drawing Sheets

(51) Int. Cl.
*H02M 1/084* (2006.01)
*G08C 23/06* (2006.01)
*H02M 7/483* (2007.01)
*H02M 7/5387* (2007.01)

(52) U.S. Cl.
CPC ......... *H02M 7/483* (2013.01); *H02M 7/5387* (2013.01); *H02M 2007/4835* (2013.01)

(58) Field of Classification Search
CPC ....... H04Q 2011/0081; H04Q 11/0005; H04Q 2011/0052; H04Q 2011/0092; H02M 7/483; H02M 7/5387; H02M 1/084; H02M 2001/0003; H02M 2007/4835; H02M 1/0845; H02J 3/36; Y02E 60/60; G08C 23/06
USPC ............. 398/115–117, 5, 111, 67, 70, 71, 72
See application file for complete search history.

(56) References Cited

U.S. PATENT DOCUMENTS

| | | | | |
|---|---|---|---|---|
| 9,190,932 | B2 * | 11/2015 | Harnefors | H02J 3/1814 |
| 9,214,871 | B2 * | 12/2015 | Tsuchiya | H02M 7/49 |
| 9,372,493 | B2 * | 6/2016 | Aiello | G05F 3/08 |
| 9,502,960 | B2 * | 11/2016 | Weyh | H02M 7/483 |
| 10,181,802 | B2 * | 1/2019 | Dommaschk | H02M 7/483 |
| 10,461,663 | B2 * | 10/2019 | Dorn | H03K 17/723 |
| 2002/0186429 | A1 * | 12/2002 | Kaspit | H04J 14/0283 398/5 |
| 2008/0166133 | A1 * | 7/2008 | Hsiao | H04B 10/807 398/168 |
| 2008/0198630 | A1 | 8/2008 | Hiller | |
| 2012/0195548 | A1 * | 8/2012 | Brunner | G02B 6/43 385/18 |
| 2016/0241125 | A1 * | 8/2016 | Couch | H02M 7/483 |
| 2016/0352208 | A1 * | 12/2016 | Wien | H02M 1/0845 |
| 2019/0028038 | A1 * | 1/2019 | Alvarez Valenzuela | H02M 7/483 |

FOREIGN PATENT DOCUMENTS

| | | | |
|---|---|---|---|
| EP | 2905889 A1 * | 8/2015 | ............ H02M 7/483 |
| EP | 2905889 A1 | 8/2015 | |
| WO | 2011120572 A1 | 10/2011 | |
| WO | 2013178249 A1 | 12/2013 | |
| WO | WO-2015044432 A1 * | 4/2015 | |

* cited by examiner

MULTILEVEL CONVERTER

BACKGROUND OF THE INVENTION

Field of the Invention

The invention relates to a modular multilevel converter having a multiplicity of submodules that each have at least two electronic switching elements and an electrical energy store.

Converters are power electronics circuits for converting electrical energy. Converters can be used to convert alternating current into direct current, direct current into alternating current, alternating current into alternating current of a different frequency and/or amplitude or direct current into direct current of a different voltage. Converters can have a multiplicity of modules of the same kind (what are known as submodules) that are electrically connected in series. Each of these submodules has at least two electronic switching elements and an electrical energy store. Such converters are referred to as modular multilevel converters. The electrical series connection of the submodules allows high output voltages to be achieved. The converters are easily adaptable (scalable) to suit different voltages, and a desired output voltage can be produced relatively accurately. Modular multilevel converters are often used in the high-voltage domain, for example as converters in high-voltage DC transmission installations or as power factor correctors in flexible three-phase transmission systems.

To actuate the electronic switching elements contained in the submodules and to report back states of the submodules (for example to report back the state of charge of the energy store of the submodule), signals are exchanged between a central control device and the submodules. For reasons of simple and inexpensive implement ability, it is desirable to arrange the control device at ground potential, whereas the individual submodules may be at different voltage potentials (including at high-voltage potentials, inter alia). Thus, the signal transmission between the control device and the submodules is frequently effected by means of optical fibers; optical signals are used.

In this case, it is conceivable for an optical fiber to be laid from the central control device to each submodule (in order to transmit signals from the control device to the submodule) and for a further optical fiber to be laid from the submodule to the control device (in order to transmit signals from the submodule to the control device). This solution thus requires two optical fibers per submodule, said optical fibers extending from the submodule to the control device. Since the control device may be at a considerable distance from the respective submodule (for example such distances may be 100 m or more), substantial lengths of optical fibers are needed and considerable costs are incurred for these optical fibers and for laying them.

SUMMARY OF THE INVENTION

The invention is based on the object of specifying a converter and a method that allow the transmission of signals between the control device and the submodules to be realized inexpensively.

This object is achieved according to the invention by a converter and by a method as claimed in the independent patent claims. Advantageous embodiments of the converter and of the method are specified in the respective dependent patent claims.

The disclosure relates to a modular multilevel converter having a multiplicity of submodules that each have at least two electronic switching elements and an electrical energy store, and having a control device for the submodules, wherein an optical output of the control device is connected to an input of an optical distributor by means of a first optical fiber, and a multiplicity of outputs of the optical distributor are connected to an optical input of a respective one of the submodules by means of a respective second optical fiber.

In the case of this modular multilevel converter, it is advantageous that only the first optical fiber is needed between the control device and the optical distributor, and that a respective separate optical fiber (referred to here as the "second optical fiber") is needed only between the optical distributor and the submodules. Depending on the distance between the control device and the optical distributor, considerable lengths of optical fibers can therefore be saved, which allows the multilevel converter to be implemented inexpensively. The optical distributor may be a passive optical distributor in this case, that is to say that the optical distributor does not require auxiliary power (zero auxiliary power optical distributor). As a result, the optical distributor may readily be arranged at high voltage potential without an expensive (on account of the high voltage potential) auxiliary power supply being needed for this optical distributor. The optical distributor distributes the optical control signals arriving at its optical input to (all of) its optical outputs.

The multilevel converter may be designed such that each of the outputs of the optical distributor is connected to a different one of the submodules (by means of the respective second optical fiber). In this embodiment, each submodule has precisely one assigned output of the optical distributor; each submodule is connected to the assigned optical output of the optical distributor by means of precisely one of the second optical fibers.

The multilevel converter may be designed such that
  the control device has a multiplicity of optical inputs, and an optical output of each of the submodules is connected to one of the optical inputs of the control device by means of a third optical fiber, or
  an optical collector has a multiplicity of optical inputs, and an optical output of each of the submodules is connected to one of the optical inputs of the optical collector by means of a third optical fiber, and an optical output of the optical collector is connected to an optical input of the control device by means of a fourth optical fiber.

In the first alternative embodiment, the optical output of the individual submodules is connected directly to the optical inputs of the control device by means of a respective third optical fiber. Thus, in this variant embodiment, no further optical component (in particular no optical collector) is necessary.

In the second alternative embodiment, the outputs of the submodules and the input of the control device have an optical collector arranged between them. The use of this optical collector allows a further reduction in the required optical fiber length to be achieved: the reason is that only a single optical fiber (the fourth optical fiber) is necessary between the optical output of the optical collector and the optical input of the control device.

Depending on the physical distance between the control device and the optical collector, this additionally allows significant lengths of optical fibers to be saved. The optical collector in this case may be a passive optical collector, that is to say that the optical collector requires no auxiliary power (zero auxiliary power optical collector). As a result, the optical collector may readily be arranged at high voltage potential, without an expensive (owing to the high voltage potential) auxiliary power supply being needed for the optical collector. The optical collector combines the optical signals arriving at (all of) its optical inputs at its optical output.

The modular multilevel converter may be designed such that each of the outputs of the submodules is connected to a different one of the optical inputs of the control device (by means of the respective third optical fiber). In this case, the output of each of the individual submodules has an assigned input of the control device. The output of the individual submodules is optically connected to this assigned input of the control device by means of the respective third optical fiber.

The multilevel converter may alternatively also be designed such that each of the outputs of the submodules is connected to a different one of the optical inputs of the optical collector (by means of the respective third optical fiber). In this embodiment, the output of each of the individual submodules has an assigned input of the optical collector. The output of the individual submodules is optically connected to the assigned optical input of the optical collector by means of the respective third optical fiber.

The multilevel converter may also be designed such that the multilevel converter has a further optical fiber that connects a further optical output of the control device to a further optical input of the optical distributor. In this case, the further optical fiber and the first optical fiber are optically connected in parallel. The further optical fiber is redundant and increases the failsafety of the multilevel converter. This is because in the event of an interruption in the first optical fiber optical control signals can be transmitted from the control device to the optical distributor via the further optical fiber.

The multilevel converter may also be designed such that the multilevel converter has an additional optical fiber that connects an additional optical output of the optical collector to an additional optical input of the control device. The additional optical fiber and the fourth optical fiber are optically connected in parallel. The additional optical fiber is redundant and increases the fail safety of the multilevel converter. This is because in the event of failure of the fourth optical fiber optical response signals coming from the submodules can be transmitted to the control device via the additional optical fiber.

The modular multilevel converter may be designed such that each of the distances between the optical collector and the submodules is shorter than the distance between the optical collector and the control device. In a multilevel converter of such design, it is possible for substantial optical fiber lengths and hence substantial costs to be saved. In general, it holds that the saving is all the greater the greater the distance between the optical collector and the control device.

The multilevel converter may also be designed such that each of the distances between the optical distributor and the submodules is shorter than the distance between the optical distributor and the control device. In this embodiment of the multilevel converter, it is likewise possible for substantial optical fiber lengths and hence substantial costs to be saved.

The disclosure additionally relates to a method for transmitting optical signals between a control device and submodules of a modular multilevel converter, wherein each of the submodules has at least two electronic switching elements and an electrical energy store, wherein an optical output of the control device transmits optical control signals to an input of an optical distributor by means of a first optical fiber, and
a multiplicity of outputs of the optical distributor transmits the optical control signals to an optical input of a respective one of the submodules by means of a respective second optical fiber.

This method may be designed such that each of the optical control signals from the outputs of the optical distributor is transmitted to a different one of the submodules (by means of the respective second optical fiber).

The method may be designed such that
the control device has a multiplicity of optical inputs, and
an optical output of each of the submodules transmits optical response signals to one of the optical inputs of the control device by means of a third optical fiber, or
an optical collector has a multiplicity of optical inputs, and an optical output of each of the submodules transmits optical response signals to one of the optical inputs of the optical collector by means of a third optical fiber, and an optical output of the optical collector transmits the optical response signals to an optical input of the control device by means of a fourth optical fiber.

The method may also be designed such that each of the optical response signals from the optical output of the submodules is transmitted to a different one of the optical inputs of the control device (by means of the respective third optical fiber).

The method may be designed such that each of the optical response signals from the optical output of the submodules is transmitted to a different one of the optical inputs of the optical collector (by means of the respective third optical fiber).

The method may also be designed such that the optical control signals from a further optical output of the control device are transmitted to a further optical input of the optical distributor by means of a fifth optical fiber. In this case, the optical control signals are transmitted from the control device to the optical distributor on two independent optical transmission paths. The fifth optical fiber is redundant and increases the fail safety of the multilevel converter.

The method may be designed such that the optical response signals from an additional optical output of the collector are transmitted to an additional optical input of the control device by means of an additional optical fiber. In this case, the optical response signals are transmitted from the optical collector to the control device on two independent optical transmission paths. The additional optical fiber is redundant and increases the fail safety of the multilevel converter.

The method may be designed such that each of the distances between the optical collector and the submodules is shorter than the distance between the optical collector and the control device.

The method may also be designed such that each of the distances between the optical distributor and the submodules is shorter than the distance between the optical distributor and the control device.

The cited embodiments of the method have the same kind of advantages as specified above in connection with the modular multilevel converter.

BRIEF DESCRIPTION OF THE SEVERAL
VIEWS OF THE DRAWING

The invention is explained in more detail below on the basis of exemplary embodiments. In this case, the same reference signs refer to elements that are the same or have the same effect. In this regard.

DESCRIPTION OF THE INVENTION

Figure 1:
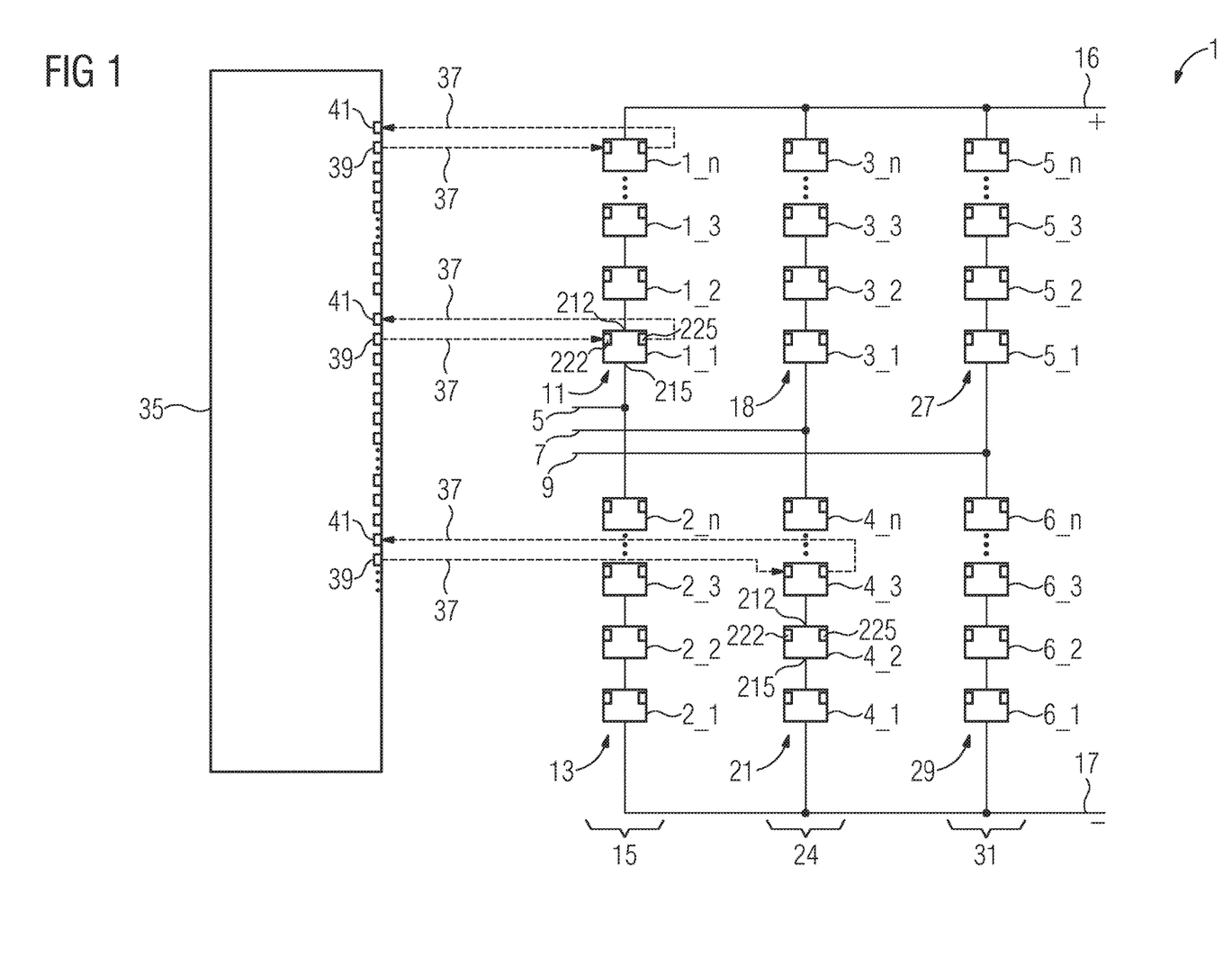
FIG. 1 depicts an exemplary embodiment of a modular multilevel converter.

FIG. 1 depicts a converter 1 in the form of a modular multilevel converter 1 (MMC). This multilevel converter 1 has a first AC voltage connection 5, a second AC voltage connection 7 and a third AC voltage connection 9. The first AC voltage connection 5 is electrically connected to a first phase module branch 11 and a second phase module branch 13. The first phase module branch 11 and the second phase module branch 13 form a first phase module 15 of the converter 1. That end of the first phase module branch 11 that is remote from the first AC voltage connection 5 is electrically connected to a first DC voltage connection 16; that end of the second phase module branch 13 that is remote from the first AC voltage connection 5 is electrically connected to a second DC voltage connection 17. The first DC voltage connection 16 is a positive DC voltage connection; the second DC voltage connection 17 is a negative DC voltage connection.

The second AC voltage connection 7 is electrically connected to one end of a third phase module branch 18 and to one end of a fourth phase module branch 21. The third phase module branch 18 and the fourth phase module branch 21 form a second phase module 24. The third AC voltage connection 9 is electrically connected to one end of a fifth phase module branch 27 and to one end of a sixth phase module branch 29. The fifth phase module branch 27 and the sixth phase module branch 29 form a third phase module 31.

That end of the third phase module branch 18 that is remote from the second AC voltage connection 7 and that end of the fifth phase module branch 27 that is remote from the third AC voltage connection 9 are electrically connected to the first DC voltage connection 16. That end of the fourth phase module branch 21 that is remote from the second AC voltage connection 7 and that end of the sixth phase module branch 29 that is remote from the third AC voltage connection 9 are electrically connected to the second DC voltage connection 17.

Each phase module branch has a plurality of submodules (1_1, 1_2, 1_3, . . . 1_n; 2_1 . . . 2_n; etc.) electrically connected in series (by means of their electrical connections). In the exemplary embodiment of FIG. 1, each phase module branch has n submodules. The number of submodules electrically connected in series (by means of their electrical connections) may be very different, there are at least two submodules connected in series, but there may also be 50 or 100 submodules, for example, electrically connected in series. In the exemplary embodiment, n=32: the first phase module branch thus has 32 submodules 1_1, 1_2, 1_3, . . . 1_32.

The left-hand area of FIG. 1 schematically depicts a control device 35 for the submodules 1_1 to 6_n. This central control device 35 transmits optical signals to the individual submodules. The signal transmission between the control device and a submodule is depicted in each case symbolically by a dashed line 37; the direction of the signal transmission is symbolized by the arrow head on the dashed lines 37. The control device 35 uses optical outputs 39 to send optical signals to the submodules and receives optical signals from the individual submodules using optical inputs 41. This is depicted using the example of the submodules 1_1, 1_n and 4_3; optical signals are sent to the other submodules and received from these submodules in the same way. According to the depiction of FIG. 1, two optical fibers are thus needed per submodule, which each extend between the submodule and the control device. This is the expensive solution with long optical fiber lengths needed that was described at the outset. By contrast, another solution is described below, for which shorter optical fiber lengths are sufficient.

Figure 2:
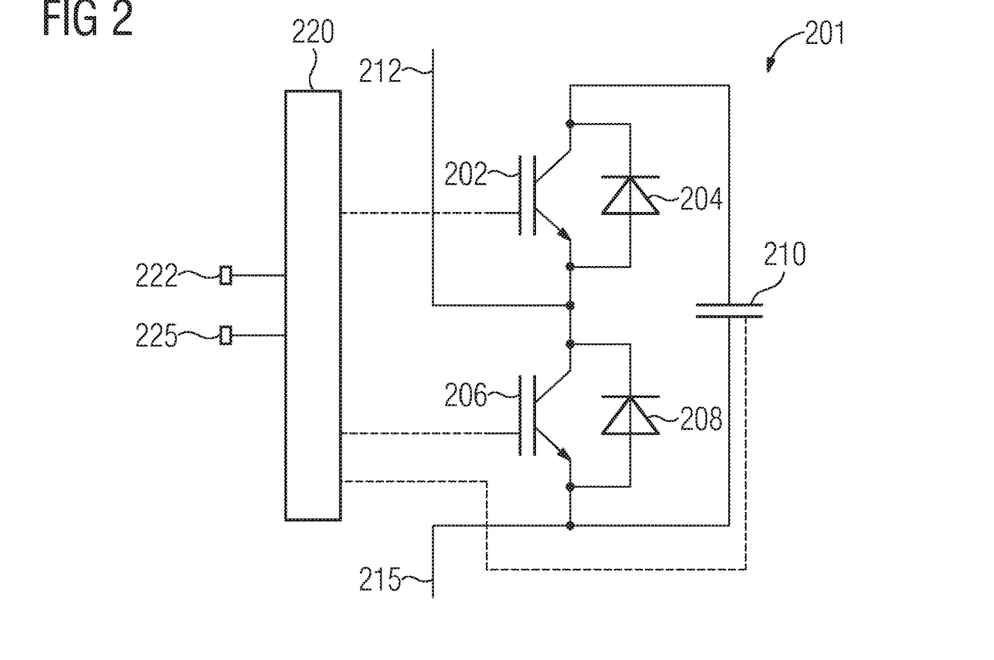
FIG. 2 depicts an exemplary embodiment of a submodule.

FIG. 2 depicts the basic design of a submodule 201 by way of example. This may be the submodule 1_1 of the first phase module branch 11 (or else one of the other submodules depicted in FIG. 1), for example. The submodule is designed as a half bridge module 201. The submodule 201 has a first deactivable semiconductor valve 202 having a first antiparallel-connected diode 204. Additionally, the submodule 201 has a second deactivable semiconductor valve 206 having a second antiparallel-connected diode 208 and also an electrical energy store 210 in the form of a capacitor 210. The first deactivable semiconductor valve 202 is a first electronic switching element 202; the second deactivable semiconductor valve 206 is a second electronic switching element 206. The first deactivable semiconductor valve 202 and the second deactivable semiconductor valve 206 are each designed as an IGBT (insulated-gate bipolar transistor). The first deactivable semiconductor valve 202 is electrically connected in series with the second deactivable semiconductor valve 206. Arranged at the connecting point between the two semiconductor valves is a first electrical submodule connection 212. Arranged on that connection of the second semiconductor valve 206 that is opposite the connecting point is a second electrical submodule connection 215. The second submodule connection 215 is additionally connected to a first connection of the energy store 210; a second connection of the energy store 210 is electrically connected to that connection of the first semiconductor valve 202 that is opposite the connecting point.

The energy store 210 is thus electrically connected in parallel with the series connection comprising the first semiconductor valve 202 and the second semiconductor valve 206. The effect that can be achieved by appropriate actuation of the first semiconductor valve 202 and the second semiconductor valve 206 by a submodule-internal electronic actuating circuit 220 is that between the first electrical submodule connection 212 and the second electrical submodule connection 215 either the voltage of the energy store 210 is output or no voltage is output (i.e. a zero voltage is output). Interaction of the submodules of the individual phase module branches thus allows the respectively desired output voltage of the converter to be produced. For the purpose of submodule-external communication, the submodule 201 has an optical communication input 222 and an optical communication output 225. The optical communication input 222 and the optical communication output 225 are connected to the actuating circuit 220. The optical communication input 222 and the optical communication output 225 each have an optical fiber connected to them for the purpose of submodule-external communication. Additionally, the actuating circuit 220 can also capture states of the submodule and report them to the central control device 35. In FIG. 2, by way of example, a dashed line is used to indicate that the actuating circuit 220 captures the state of charge of the energy store 210 and can report it to the central control device 35.

The optical communication input 222 of the submodule 201 forwards the optical signals (optical messages) arriving at it to the actuating circuit 220; the actuating circuit 220 outputs (altered or unaltered) optical signals at the optical communication output 225 of the sub module.

Figure 3:
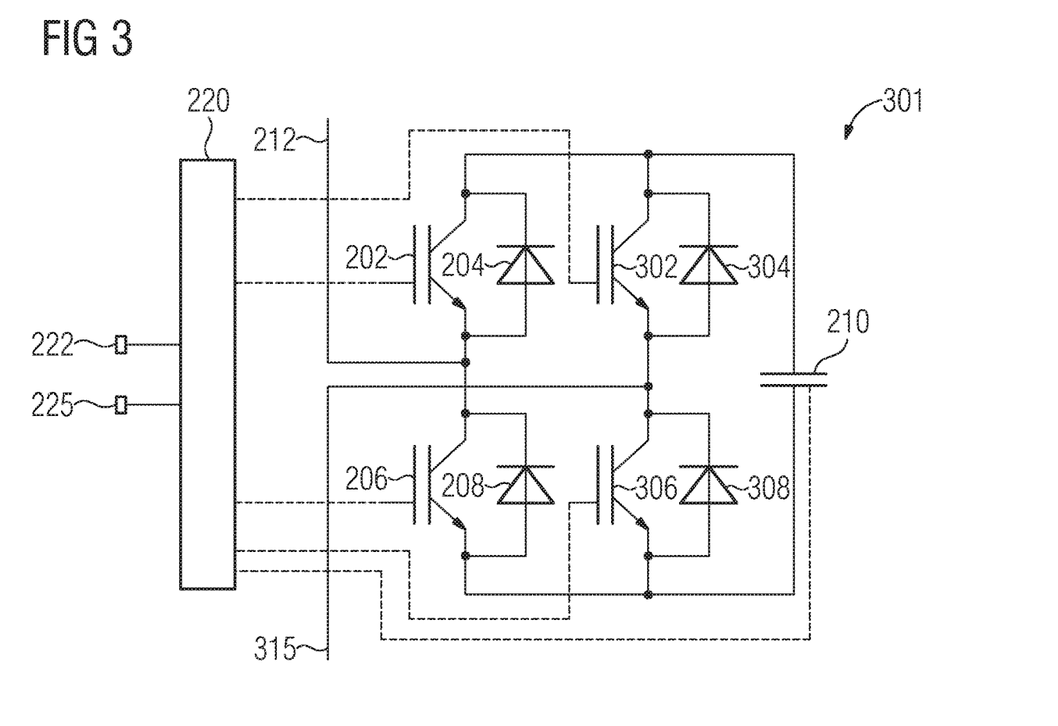
FIG. 3 depicts a further exemplary embodiment of a submodule.

FIG. 3 depicts a further exemplary embodiment of a submodule 301. This submodule 301 may be the submodule 1_n (or else one of the other submodules depicted in FIG. 1) for example. Besides the first semiconductor valve 202, second semiconductor valve 206, first diode 204, second diode 208, energy store 210 and actuating circuit 220 already known from FIG. 2, the submodule 301 depicted in FIG. 3 has a third deactivable semiconductor valve 302 having an antiparallel-connected third diode 304 and a fourth deactivable semiconductor valve 306 having a fourth antiparallel-connected diode 308. The third deactivable semiconductor valve 302 is a third electronic switching element 302; the fourth deactivable semiconductor valve 306 is a fourth electronic switching element 306. The third deactivable semiconductor valve 302 and the fourth deactivable semiconductor valve 306 are each designed as an IGBT. In contrast to the circuit of FIG. 2, the second electrical submodule connection 315 is connected not to the second semiconductor valve 206 but rather to a center point of an electrical series connection comprising the third semiconductor valve 302 and the fourth semiconductor valve 306.

The submodule 301 of FIG. 3 is what is known as a full bridge module 301. This full bridge module 301 is distinguished in that appropriate actuation of the four semiconductor valves between the first electrical submodule connection 212 and the second electrical submodule connection 315 can entail a choice of either the positive voltage of the energy store 210, the negative voltage of the energy store 210 or a voltage having the value zero (zero voltage) being output. Therefore, it is thus possible for the full bridge module 301 to be used to reverse the polarity of the output voltage. The converter 1 can have either only half bridge modules 201, only full bridge modules 301 or else half bridge modules 201 and full bridge modules 301.

Each of the depictions of FIGS. 2 and 3 shows a submodule having the first electrical submodule connection 212 and the second electrical submodule connection 215 or 315. The first electrical submodule connection 212 and the second electrical submodule connection 215, 315 carry large electrical currents of the converter. Additionally, each submodule has the actuating circuit 220, which actuates the switching elements 202, 206, 302 and/or 306, in particular. This actuating circuit 220 communicates with submodule-external units (in this case: for example with an optical distributor 412 or with an optical collector 503, cf. FIGS. 4 and 5) via the optical communication input 222 and the optical communication output 225 by means of optical fibers in potential-isolated fashion. The interconnection/connection of the optical communication input 222 and the optical communication output 225 of the individual submodules by means of optical fibers is described below.

Figure 4:
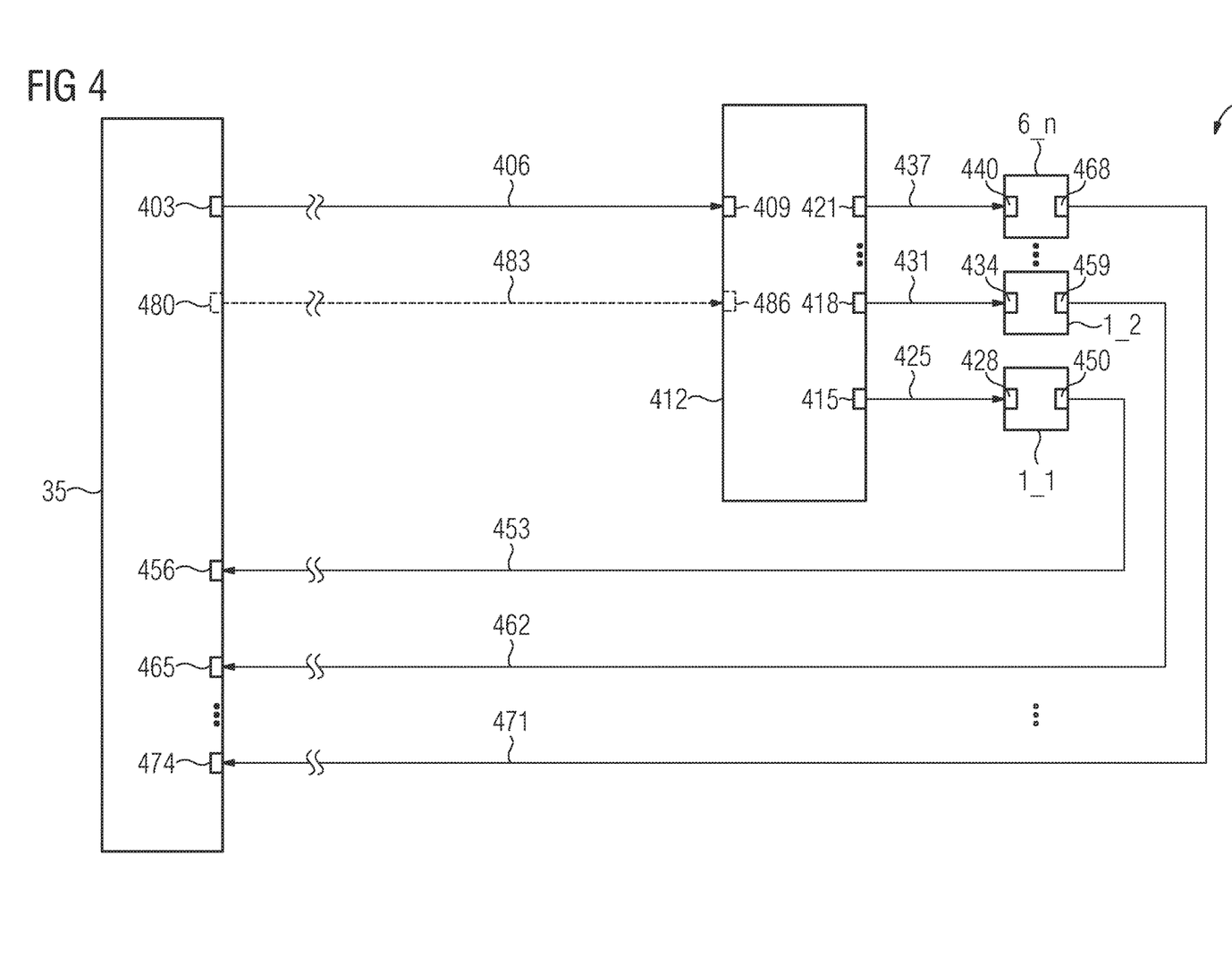
FIG. 4 depicts an exemplary embodiment of a multilevel converter having an optical distributor.

FIG. 4 depicts only the control device 35 and, as an example, three submodules, namely a first submodule 1_1, a second submodule 1_2 and an m-th sub module 6_n, of the multilevel converter 1 known from FIG. 1. All further submodules of the multilevel converter 1 are arranged in the same manner as these three submodules depicted by way of example.

An optical output 403 of the control device 35 is optically connected to an optical input 409 of an optical distributor 412 by means of a first optical fiber 406. The optical distributor 412 has a multiplicity of optical outputs, of which a first optical output 415, a second optical output 418 and an m-th optical output 421 are depicted here by way of example. The optical distributor 412 thus has m optical outputs, where: m=number of submodules (to be actuated) of the multilevel converter=number of outputs of the optical distributor, in the exemplary embodiment m=6*32=192. In the course of this description, the number m is also referred to as a "multiplicity". In other exemplary embodiments, the number m can naturally also assume other values. By way of example, the number m may be between 96 and 384.

The optical distributor 412 is a passive optical distributor. The optical distributor 412 distributes the optical control signals arriving at its optical input to all of its optical outputs. The first optical output 415 is optically connected to a first optical input 428 of the first submodule 1_1 by means of an optical fiber 425. In the same manner, the second optical output 418 of the optical distributor 412 is optically connected to a second optical input 434 of the second submodule 1_2 by means of an optical fiber 431. Similarly, the m-th optical output 421 is optically connected to an m-th optical input 440 of the m-th sub module 6_n by means of an optical fiber 437.

The three optical fibers 425, 431 and 437 cited by way of example are also referred to as "second optical fibers" in the course of this description, forming a second group of optical fibers, so to speak, namely the optical fibers extending from the outputs of the optical distributor 412 to the inputs of the sub modules.

A first optical output 450 of the first submodule 1_1 is optically connected to a first optical input 456 of the control device 35 by means of an optical fiber 453. Similarly, a second optical output 459 of the second submodule 1_2 is optically connected to a second optical input 465 of the control device 35 by means of an optical fiber 462. In the same manner, the m-th optical output 468 of the m-th sub module 6_n is optically connected to an m-th optical input 474 of the control device 35 by means of an optical fiber 471.

The optical fibers 453, 462 and 471 are also referred to as "third optical fibers" in the course of this description. These third optical fibers form a group of optical fibers that are connected to the optical outputs of the individual sub modules.

The multilevel converter 1 can optionally have a further optical fiber 483: an (optional) further optical output 480 of the control device 35 is optically connected to an (optional) second optical input 486 of the optical distributor 412 by means of the further optical fiber 483. The second optical input 486 is subsequently also referred to as an (optional) further optical input 486 of the optical distributor 412. The further optical fiber 483 is optional, that is to say that the further optical fiber 483 can also be omitted in other exemplary embodiments. Therefore, the further optical fiber 483 is depicted by means of a dotted line.

The further optical fiber 483 is redundant and is used to ensure the optical signal transmission between the control device 35 and the optical distributor 412 in the event of possible failure of the first optical fiber 406. That is to say that, in the event of failure of the first optical fiber 406, the further optical fiber 483 is used to transmit the same optical signals as have previously been transmitted via the first optical fiber 406.

Figure 5:
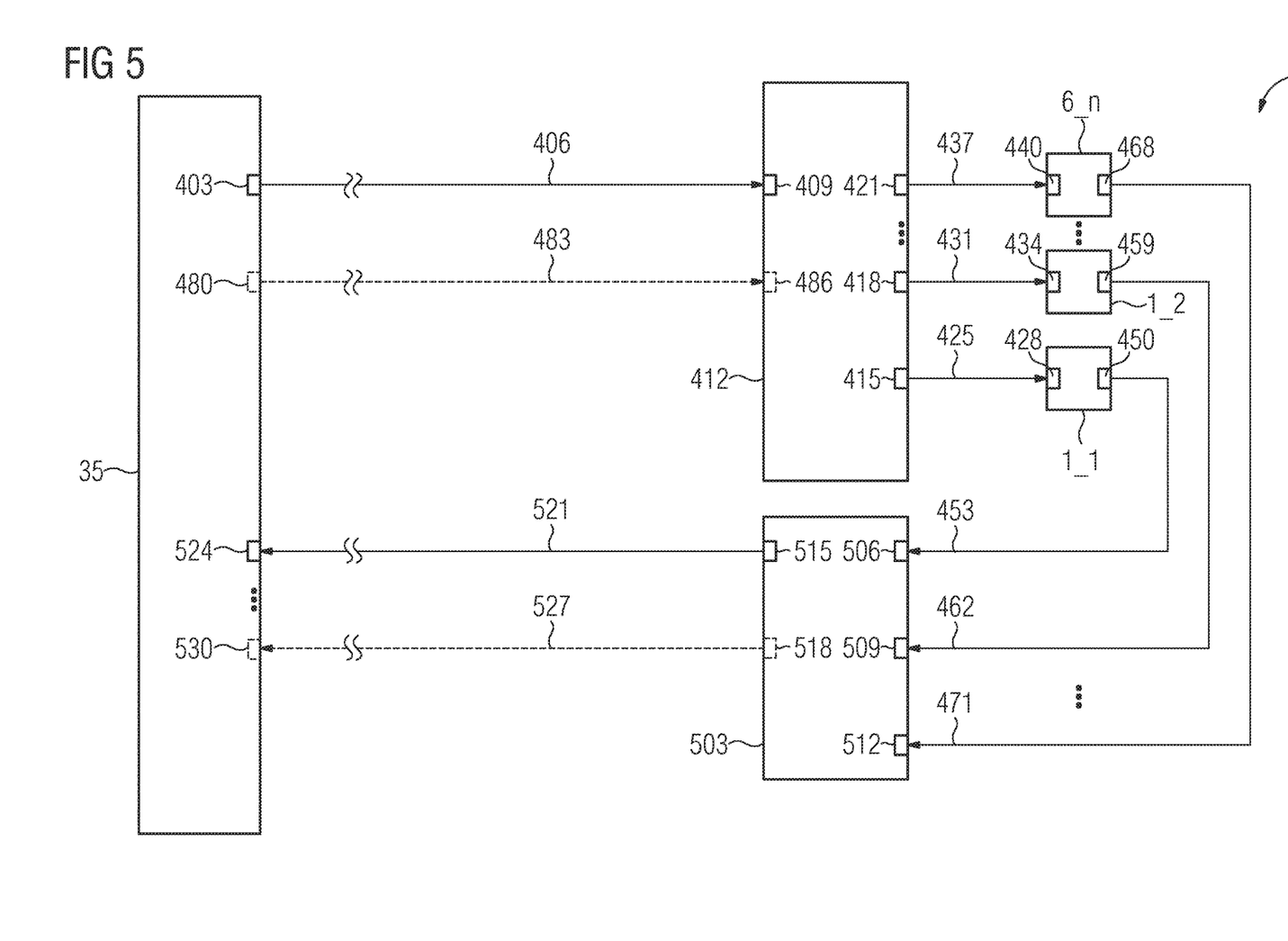
FIG. 5 depicts an exemplary embodiment of a multilevel converter having an optical distributor and an optical collector.

FIG. 5 depicts a further exemplary embodiment of a modular multilevel converter 1. This exemplary embodiment differs from the exemplary embodiment of FIG. 4 in that the outputs of the submodules and the control device have an optical collector 503 arranged between them. Of this optical collector 503, a first optical input 506, a second optical input 509 and an m-th optical input 512 are depicted by way of example. Additionally, the optical collector 503 has a first optical output 515. The optical collector 503 is a passive optical collector. The optical collector 503 combines the optical response signals arriving at all of its optical inputs at its first optical output 515.

Optionally, the optical collector 503 has a second optical output 518. The second optical output 518 is subsequently also referred to as an (optional) additional optical output 518.

The optical fiber 453 optically connects the first optical output 450 of the first submodule 1_1 to the first optical input 506 of the optical collector 503. Similarly, the optical fiber 462 connects the second optical output 459 of the second submodule 1_2 to the second optical input 509 of the optical collector 503. In the same manner, the optical fiber 471 connects the m-th optical output 468 of the m-th sub module 6_n to the m-th optical input 512 of the optical collector 503.

The first optical output 515 of the optical collector 503 is optically connected to a first optical input 524 of the control device 35 by means of a fourth optical fiber 521. The first optical input 524 differs from the first optical input 456 of the exemplary embodiment of FIG. 4 because the first optical input 524 is set up such that it can receive the response signals of all of the submodules (and not just the response signal of the submodule 1_1 as in the exemplary embodiment of FIG. 4).

The additional optical output 518 of the optical collector 503 is optically connected to an (optional) additional optical input 530 of the control device 35 by means of an additional optical fiber 527. The additional optical fiber 527 is optional, that is to say that it can also be omitted in other exemplary embodiments. Therefore, the additional optical fiber 527 is depicted by means of a dotted line. If the fourth optical fiber 521 is interrupted, then the response signals from the optical collector 503 are transmitted to the control device 35 via the additional optical fiber 527. The additional optical fiber 527 is thus used to transmit the same optical signals, in the event of failure of the fourth optical fiber 521, as would otherwise have been transmitted via the fourth optical fiber 521.

As indicated in FIGS. 4 and 5, each of the distances between the optical distributor 412 and the submodules 1_1, 1_2 to 6_n is advantageously shorter than the distance between the optical distributor 412 and the control device 35. As indicated in FIG. 5, each of the distances between the optical collector 503 and the submodules 1_1, 1_2 to 6_n is likewise shorter than the distance between the optical collector 503 and the control device 35. As a result, the saving of optical fibers turns out to be particularly significant.

The described method, in detail, proceeds as follows in this case: each submodule 1_1, 1_2 to 6_n has a separate allocated address, in particular a unique address. Such an address is an individual digit string or character string, for example. The address allocation (address assignment) can be made by means of one of the two variants depicted below, for example:

Variant 1:
Each submodule has a coding connector in which the address is stored. Thus, if 24 submodules are connected to the optical distributor 412, for example, then there are 24 different coding connectors with 24 different addresses.

Variant 2:
Each submodule has an address firmly implemented in it on the hardware. The address in this case may be a kind of "submodule number", for example, which is stored in a memory chip of the sub module.

These addresses can be requested by the control device 35 at the beginning of the method. This is possible by means of a request message, for example, which may be realized in similar fashion to the "ping" command (known from Internet communication). This request can optionally also be used to detect which submodule is installed at which installation location of the converter: in the exemplary embodiment shown in FIG. 4, the installation location can be detected on the basis of that optical input of the control device 35 at which the respective address is received.

The control device sends optical control signals to the individual submodules, and the submodules send optical response signals to the control device. Both the optical control signals and the optical response signals may be designed as coded optical telegrams in this case. The optical control signals are distributed to all submodules of the converter by the optical distributor 412. Each control signal (or each telegram) has the respective address of the submodule at which the control signal is directed indicated in it. Each submodule takes the addresses that the control signals contain as a basis for picking out those control signals that are directed at it. The other control signals are ignored by this sub module.

As an option, it is possible to send control signals to all submodules of the multilevel converter. For this purpose, a specific group address can be set up, to which all sub modules react.

Similarly, all optical response signals are provided with the address of the respective submodule from which the respective response signal has been sent. This is important in particular in the case of the exemplary embodiment of FIG. 5, because the control device 35 can take the addresses that the response signals contain as a basis for detecting the submodule from which the response signal comes. In the exemplary embodiment of FIG. 4, it is also possible to dispense with the address in the response signals, because the control device can take the optical input (at which the response signal arrives) as a basis for detecting the submodule from which this response signal comes.

In the exemplary embodiment of FIG. 5, it is furthermore necessary to ensure that the individual submodules do not send response signals to the control device simultaneously. This is because simultaneously sent response signals would overlap in the optical collector 35 and would then no longer be readable by the control device 35. Simultaneous sending of response signals by the submodules can be prevented, by way of example, by virtue of the submodules responding to a control signal from the control device only directly after reception of said control signal. Staggered sending of control signals for the individual submodules can achieve the effect that each of the submodules also sends response signals in staggered fashion.

Figure 6:
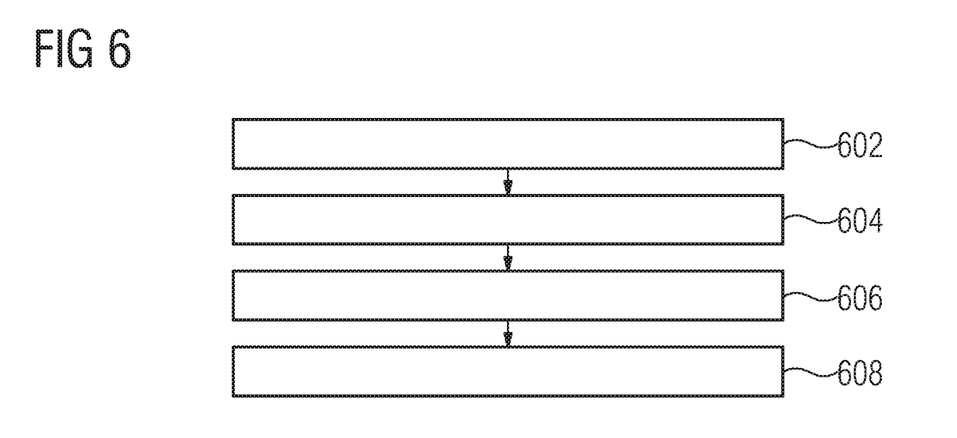
FIG. 6 depicts an exemplary method cycle.

FIG. 6 depicts an overview of a first exemplary method cycle. This method cycle relates to the exemplary embodiment of FIG. 4.

Method step 602: The control device 35 sends a control signal addressed to one of the submodules, for example to the submodule 1_2. The control signal contains the address of this submodule, for example the address of the submodule 1_2.

Method step 604: The control signal reaches the optical distributor 412 via the first optical fiber 406. The optical distributor 412 distributes the control signal to all submodules (connected to the optical distributor) via the second optical fibers 425, 431, 437.

Method step 606: The addressed submodule (in this case: the submodule 1_2) detects from the address that the control signal contains that the control signal is directed at it, i.e. that it is affected by the control signal.

Method step 608: The submodule (in this case: the submodule 1_2) reacts to the control signal (for example by virtue of one or more of the electronic switching elements being switched on) and then sends a response signal to the control device 35. This response signal is transmitted to the applicable optical input (in this case: to the second optical input 465) of the control device 35 via the applicable third optical fiber (in this case: via the third optical fiber 462).

Figure 7:
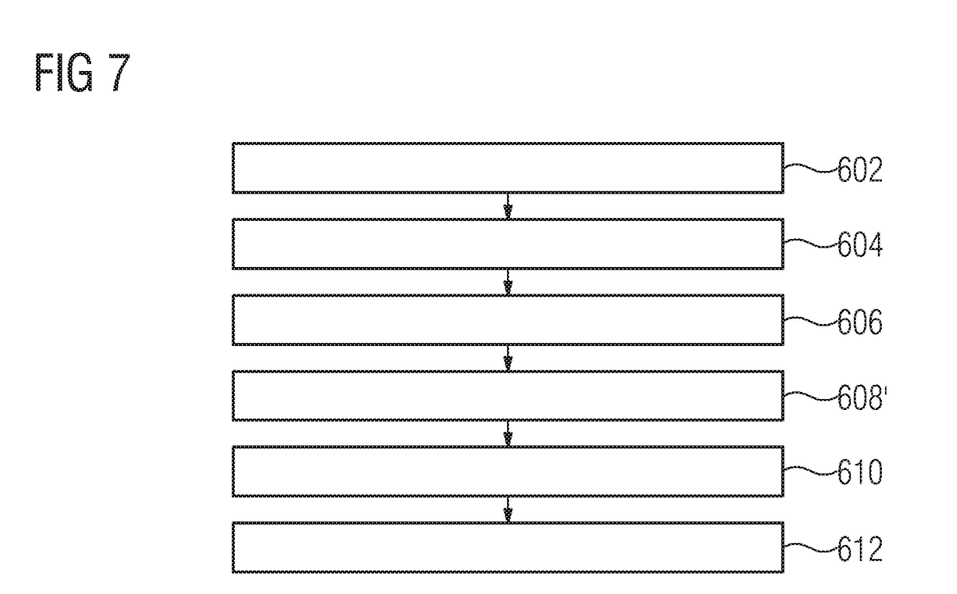
FIG. 7 depicts a further exemplary method cycle.

FIG. 7 depicts an overview of a second exemplary method cycle. This method cycle relates to the exemplary embodiment of FIG. 5.

Method steps 602, 604 and 606 are identical to the exemplary embodiment of FIG. 6.

Method step 608': The submodule (in this case: the submodule 1_2) reacts to the control signal (for example by virtue of one or more of the electronic switching elements being switched on) and then sends a response signal to the control device 35. This response signal contains the address of the submodule (in this case: the address of the submodule 1_2). This response signal is transmitted to the applicable optical input (in this case: to the second optical input 509) of the optical collector 503 via the applicable third optical fiber (in this case: via the third optical fiber 462).

Method step 610: The response signals of all submodules are combined by the optical collector at the optical output thereof. In the exemplary embodiment, the response signal of the submodule 1_2 is routed to the first optical output 515 of the optical collector 503. This optical output 515 of the optical collector 503 routes the response signal to the first optical input 524 of the control device 35 via the fourth optical fiber 521.

Method step 612: The control device 35 takes the address that the response signal contains as a basis for detecting the submodule from which this response signal comes. In the example, the control device 35 takes the address that the response signal contains for the submodule 1_2 as a basis for detecting that the response signal comes from the sub module 1_2.

A multilevel converter and a method for transmitting optical signals have been described that allow the number of optical fibers and hence also the total length of the optical fibers to be significantly reduced. This results firstly in a considerable cost reduction and secondly also in a considerable space saving (fewer optical fibers need to be laid). Redundant optical fibers furthermore allow the reliability of the signal transmission to be improved and, as a result, the availability of the multilevel converter to be increased.

The invention claimed is:

1. A modular multilevel converter, comprising:
    a multiplicity of sub modules each having at least two electronic switching elements and an electrical energy storage device, each of said sub modules having an optical input;
    a control device for controlling said sub modules, said control device having at least one optical output; and
    an optical distributor having at least one input connected to said optical output of said control device by way of a first optical fiber, and said optical distributor having a multiplicity of outputs connected to said optical input of a respective one of said sub modules by way of a respective second optical fiber, and said optical distributor being configured to distribute an optical signal received at said input to said multiplicity of signal outputs of said optical distributor;
    wherein said control device has a multiplicity of optical inputs, and an optical output of each of said sub modules is connected to a different one of said optical inputs of said control device by way of a third optical fiber; or
    wherein an optical collector has a multiplicity of optical inputs, and an optical output of each of said sub modules is connected to one of said optical inputs of said optical collector by way of a third optical fiber, and an optical output of said optical collector is connected to an optical input of said control device by way of a fourth optical fiber; and
    wherein each of said outputs of said sub modules is connected to a different one of said optical inputs of said control device.

2. The modular multilevel converter according to claim 1, wherein each of said outputs of said optical distributor is connected to a different one of said sub modules.

3. The modular multilevel converter according to claim 1, wherein each of said outputs of the said modules is connected to a different one of said optical inputs of said optical collector.

4. The modular multilevel converter according to claim 1, which comprises a further optical fiber connecting a further optical output of said control device to a further optical input of said optical distributor.

5. The modular multilevel converter according to claim 1, further comprising an additional optical fiber connecting an additional optical output of said optical collector to an additional optical input of said control device.

6. The modular multilevel converter according to claim 1, wherein a spacing distance between said optical collector and each said sub module is shorter than a distance between said optical collector and said control device.

7. The modular multilevel converter according to claim 1, wherein a spacing distance between said optical distributor and said sub modules is shorter than a distance between said optical distributor and said control device.

8. A method for transmitting optical signals between a control device and a plurality of sub modules of a modular multilevel converter, wherein each of the sub modules has at least two electronic switching elements and an electrical energy storage device, the method comprising:
    transmitting optical control signals from an optical output of the control device to an input of an optical distributor by way of a first optical fiber;
    distributing the optical control signals received at the input of the optical distributor to a multiplicity of outputs of the optical distributor; and
    transmitting the optical control signals from the multiplicity of outputs of the optical distributor to an optical input of a respective one of the sub modules by way of a respective second optical fiber;

providing the control device with a multiplicity of optical inputs, and transmitting optical response signals from an optical output of each of the sub modules to one of the optical inputs of the control device by way of a third optical fiber; or providing an optical collector with a multiplicity of optical inputs, and transmitting optical response signals from an optical output of each of the sub modules to one of the optical inputs of the optical collector by way of a third optical fiber, and transmitting the optical response signals from an optical output of the optical collector to an optical input of the control device by way of a fourth optical fiber; and transmitting each of the optical response signals from the optical output of the sub modules to a different one of the optical inputs of the control device.

9. The method according to claim 8, which comprises transmitting each of the optical control signals from the outputs of the optical distributor to a different one of the sub modules.

10. The method according to claim 8, which comprises transmitting each of the optical response signals from the optical output of the sub modules to a different one of the optical inputs of the optical collector.

11. The method according to claim 8, which comprises transmitting the optical control signals from a further optical output of the control device to a further optical input of the optical distributor by way of a further optical fiber.

12. The method according to claim 8, which comprises transmitting the optical response signals from an additional optical output of the collector to an additional optical input of the control device by way of an additional optical fiber.

13. The method according to claim 8, wherein a spacing distance between the optical collector and each of the sub modules is shorter than a distance between the optical collector and the control device.

14. The method according to claim 8, wherein a spacing distance between the optical distributor and each of the sub modules is shorter than a distance between the optical distributor and the control device.

* * * * *